(12) United States Patent
Chang et al.

(10) Patent No.: US 8,688,445 B2
(45) Date of Patent: Apr. 1, 2014

(54) MULTI-CORE PROCESSING FOR PARALLEL SPEECH-TO-TEXT PROCESSING

(75) Inventors: Walter W. Chang, San Jose, CA (US); Michael J. Welch, Los Angeles, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1266 days.

(21) Appl. No.: 12/332,309

(22) Filed: Dec. 10, 2008

(65) Prior Publication Data

US 2013/0166285 A1 Jun. 27, 2013

(51) Int. Cl.
*G10L 15/26* (2006.01)
(52) U.S. Cl.
USPC ........................................................ 704/235
(58) Field of Classification Search
USPC ........................................................ 704/235
See application file for complete search history.

(56) References Cited

U.S. PATENT DOCUMENTS

| | | | |
|---|---|---|---|
| 6,173,259 B1 | 1/2001 | Bijl et al. | |
| 6,366,882 B1 * | 4/2002 | Bijl et al. | 704/235 |
| 6,704,709 B1 * | 3/2004 | Kahn et al. | 704/235 |
| 6,775,651 B1 | 8/2004 | Lewis et al. | |
| 7,693,267 B2 | 4/2010 | Howell et al. | |
| 7,945,456 B2 * | 5/2011 | Schoenberg | 705/2 |
| 8,423,361 B1 * | 4/2013 | Chang et al. | 704/235 |

* cited by examiner

*Primary Examiner* — Susan McFadden
(74) *Attorney, Agent, or Firm* — Wolfe-SBMC

(57) ABSTRACT

This specification describes technologies relating to multi core processing for parallel speech-to-text processing. In some implementations, a computer-implemented method is provided that includes the actions of receiving an audio file; analyzing the audio file to identify portions of the audio file as corresponding to one or more audio types; generating a time-ordered classification of the identified portions, the time-ordered classification indicating the one or more audio types and position within the audio file of each portion; generating a queue using the time-ordered classification, the queue including a plurality of jobs where each job includes one or more identifiers of a portion of the audio file classified as belonging to the one or more speech types; distributing the jobs in the queue to a plurality of processors; performing speech-to-text processing on each portion to generate a corresponding text file; and merging the corresponding text files to generate a transcription file.

49 Claims, 8 Drawing Sheets

MULTI-CORE PROCESSING FOR PARALLEL SPEECH-TO-TEXT PROCESSING

BACKGROUND

The present disclosure relates to multi-core processing for parallel speech-to-text processing.

Speech-to-text systems generate a text transcript from audio content. Speech-to-text techniques typically use speech recognition to identify speech from audio. Speech-to-text can be used for several speech recognition applications including, for example, voice dialing, call routing, data entry, and dictation.

A speech-to-text recognition system typically digitizes an audio signal into discreet samples. Those discreet samples are generally processed to provide a frequency domain analysis representation of the original input audio signal. With the frequency domain analysis of the signal, a recognition system maps the frequency domain information into phonemes. Phonemes are the phonetic sounds that are the basic blocks used to create words in every spoken language. For example, the English written language has an alphabet of 26 letters. However, the vocabulary of English phonemes is typically a different size. The mapping provides a string of phonemes mapped to the frequency domain analysis representation of the original input signal. Speech detection processing resolves the phonemes using a concordance or a dictionary.

A typical parallel processing technique includes a split function that physically divides an audio file into roughly equal portions. The split function intelligently divides the audio file, e.g., so that the division does not split words. The split points occur in intervals with no sound or during any intervals a signal classifier identifies as non-dialogue. The split function accepts an optional exclusion interval file to identify and filter non-dialogue from the audio file. The split function separates the entire audio file into portions having approximately the same amount of transcription data. The processes complete at approximately the same time. The portions are processed into text files.

Once text files are generated, a merge function that accepts partial speech-to-text transcripts merges separate text files from the processed portions into one transcription file. The merge function uses a master time portion index of start and end times for each portion. The split method generates the master portion index, which is used to sequence time codes for text files being merged. When the last portion has been processed to the last text file, the initiating master process then invokes the merge function to recombine the results. The output from this process is a single textual transcription of the original input signal.

SUMMARY

This specification describes technologies relating to multi-core processing for parallel speech-to-text processing.

In general, one aspect of the subject matter described in this specification can be embodied in computer-implemented methods that include the actions of receiving an audio file; analyzing the audio file to identify portions of the audio file as corresponding to one or more audio types, the one or more audio types including one or more speech types; generating a time-ordered classification of the identified portions, the time-ordered classification indicating the one or more audio types and position within the audio file of each respective portion; generating a queue using the time-ordered classification, the queue including multiple jobs where each job includes one or more identifiers of a respective portion of the audio file classified as belonging to the one or more speech types; distributing the jobs in the queue to processors for speech-to-text processing of the corresponding portion of the audio file; performing speech-to-text processing on each portion to generate a corresponding text file; and merging the corresponding text files to generate a transcription file, the text files merged in order based on the order in which the portions of the audio file occur within the audio file. Other embodiments of this aspect include corresponding systems, apparatus, and computer program products.

These and other embodiments can optionally include one or more of the following features. The method further includes distributing the processor job descriptors for the portions of the audio file in the queue occurs in a first-in-first-out order. The method further includes distributing one or more of the jobs in the queue before the generated queue is completed. The method further includes dividing merging the text files recursively amongst the processors.

The method further includes distributing the processors amongst one or more computing devices. The method further includes distributing the jobs in the queue to two or more remote locations, each remote location including multiple processors, each remote location connected to one or more other remote locations. The method further includes one or more audio types including data with spoken language. The method further includes partitioning the queue into units based on a specified amount of time; and partitioning the units in substantially equal amounts of time to each of the processors. The method further includes partitioning the queue into units based on a specified amount of data; and partitioning the units in substantially equal amounts of data to each of the processors.

The method further includes a client device identifying and classifying the portions of the audio file into the one or more audio types within the audio file. The method further includes partitioning the received audio file for identification and classification using multiple classifiers. The method further includes the classifiers including one or more of the following classifiers: dialogue, applause, music, silence, and ambient noise. The method further includes storing the transcription file. The method further includes generating portion descriptors for each portion. The method further includes the portion descriptors including metadata associated with amount of time and one or more classifiers associated with the portions of the audio file. The method further includes the time-ordered classification including determining a time interval for each portion of the identified portions.

In general, one aspect of the subject matter described in this specification can be embodied in methods performed by a computer programmed to provide speech-to-text processing include the actions of receiving an audio file; analyzing the audio file to identify portions of the audio file as corresponding to one or more audio types, the one or more audio types including one or more speech types; generating a time-ordered classification of the identified portions, the time-ordered classification indicating the one or more audio types and position within the audio file of each respective portion; generating a queue using the time-ordered classification, the queue including a plurality of jobs where each job includes one or more identifiers of a respective portion of the audio file classified as belonging to the one or more speech types; distributing the jobs in the queue to a plurality of processors for speech-to-text processing of the corresponding portion of the audio file; performing speech-to-text processing on each portion to generate a corresponding text file; and merging the corresponding text files to generate a transcription file, the text files merged in order based on the order in which the portions of the audio file occur within the audio file.

Particular embodiments of the subject matter described in this specification can be implemented to realize one or more of the following advantages. The system enhances speech-to-text transcription to provide accurate transcripts of an audio file in an efficient manner. Removing non-dialogue portions before speech-to-text processing decreases the amount of time for processing and improves the accuracy of the transcript by removing audio data that can trigger false positives. Additionally, using multi-core parallel processing reduces the amount of time to complete a transcription, while allowing portions of the audio file to be processed in larger portions. The system requires less computer readable storage space and less transfer time to process the portions than serial processing and other parallel speech-to-text techniques.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
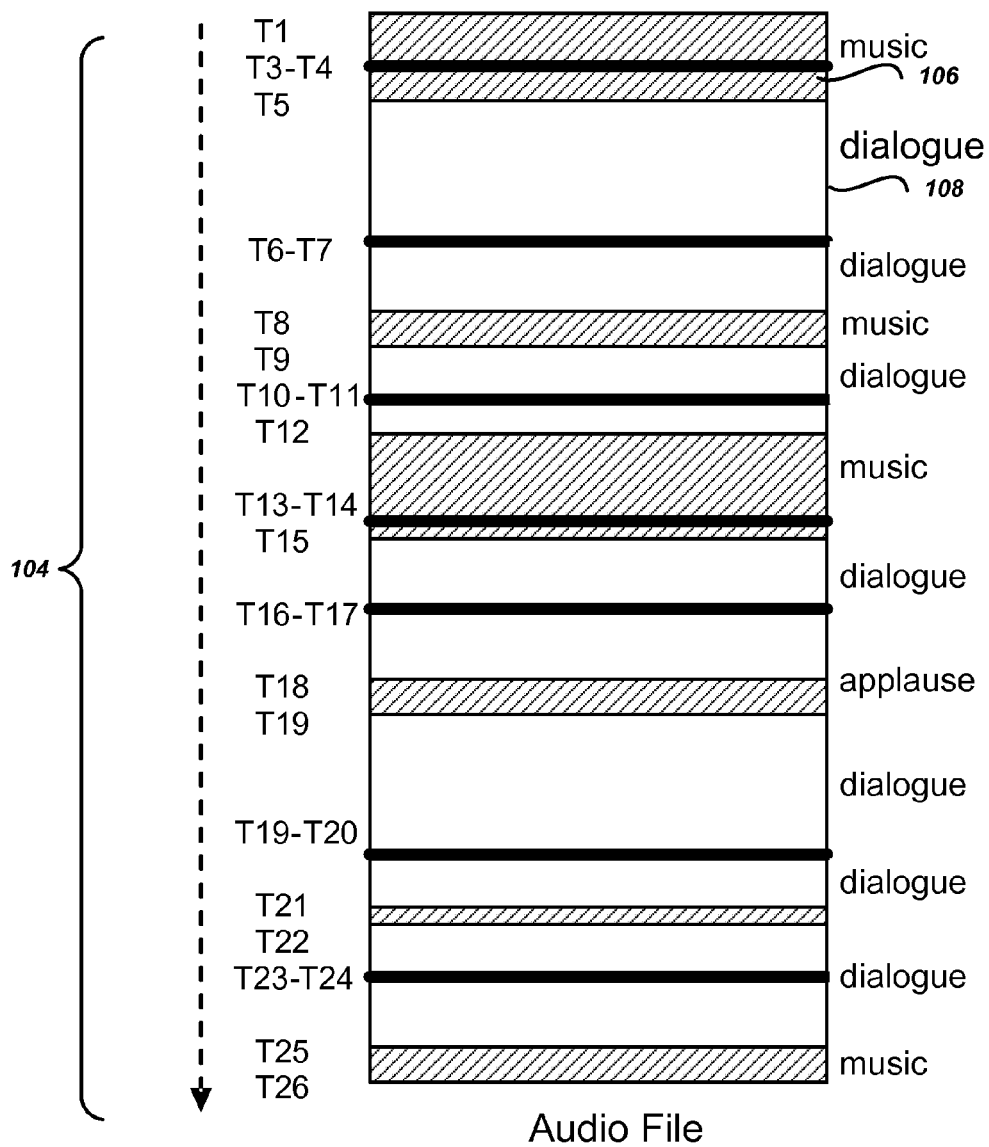
FIG. 1 is an illustration of an example audio file partitioned into portions classified according to audio type.

FIG. 1 is an illustration 100 of an example audio file 102 classified by audio types. An audio file can include different types of audio data. For example, a typical movie includes dialogue, a score, and sound effects. Often, there are periods of silence in a movie. The amount of time where speech is present in a movie can be minimal, e.g., "The Bear" where only a few moments of human speech are heard, or where the dialogue drives the plot, e.g., "A Man for All Seasons," adapted from a Robert Bolt play. In either example movie's case, the entire movie does not have speech for every minute, and a percentage of the audio file for the movie would not provide useful data from speech-to-text processing.

The audio file 102 in FIG. 1 illustrates the divisions that can occur in an audio file for a movie or television show. In particular, the illustration 100 includes a time scale 104 and different identified audio types for portions of the audio file 102. For example, the illustration 100 identifies a music portion 106 and a dialogue portion 108. The identified types in the audio file 102 are classified into time ordered portions according to the time scale 104. For example, the music portion 106 begins at T1 and ends at T5 and the dialogue portion 108 begins at T5 and ends at T8. Identified portions can be non-contiguous. As shown in FIG. 1, the portions 106, 108 are non-contiguous. For example, the music portion 106 is split from T1 to T3 and from T4 to T5. FIG. 1 shows T3-T4, T6-T7, T13-T14 all indicating silence intervals. These intervals are detected when no signal is present or the signal is below a volume threshold. The system can use these silence intervals as candidate locations to partition the audio file 102 when no other music or non-dialogue signal is detected.

The audio file 102 includes data with spoken language. In some implementations, the music portion 102 includes spoken language in addition to music, e.g., a rap song, or a musical with an interlude. Likewise, the spoken language can include lyrics in a song. Other portions can also include a spoken language component.

In some implementations, non-dialogue portions create artifacts that can mirror speech even if the sound is not speech. For example, music can result in speech-to-text processing false positives, e.g., a string of words "the" "the" "the". Thus, music or sound effects can trigger speech-to-text processing.

Figure 2:
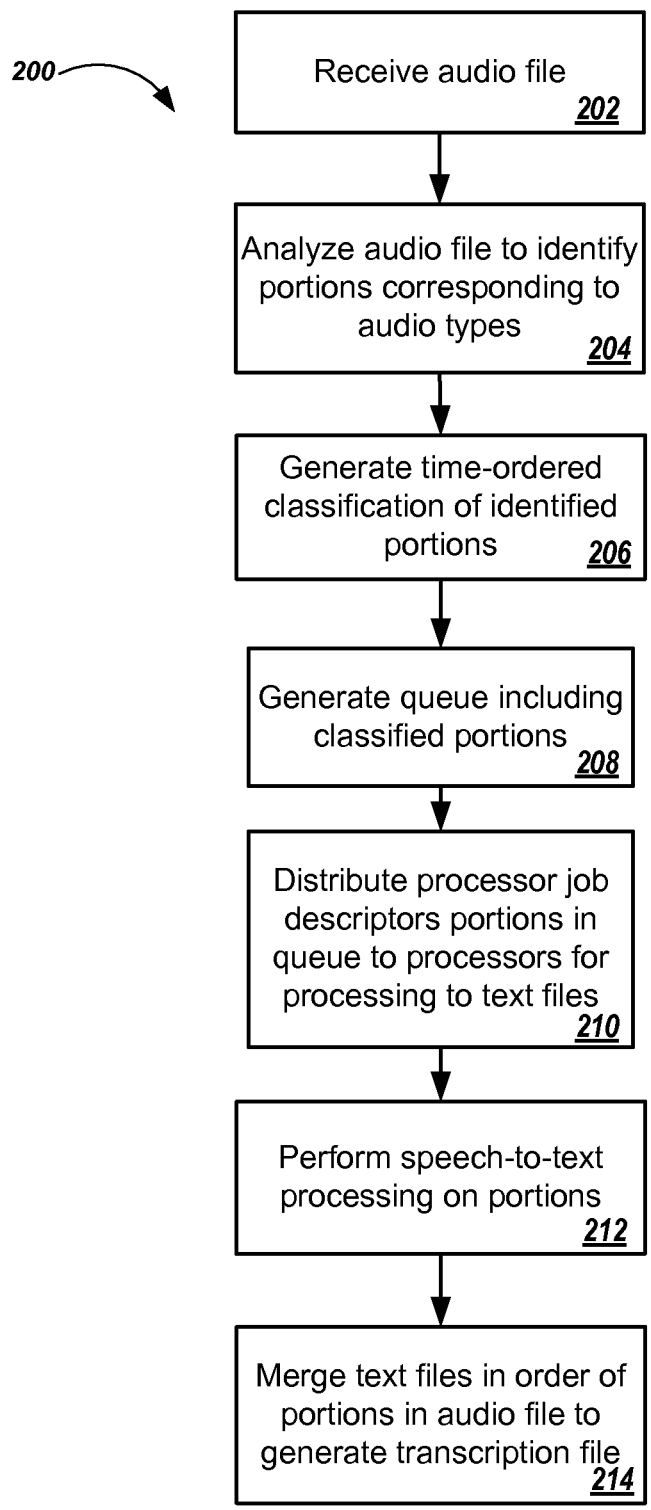
FIG. 2 is a flow chart of an example method for speech-to-text processing audio files using multi-core parallel processing.

FIG. 2 is a flow chart of an example method 200 for speech-to-text processing audio files using multi-core parallel processing. For convenience, the method 200 will be described with respect to a system that will perform the method 200.

The system receives 202 an audio file. The audio file may be received from a computer readable medium, e.g., a CD, DVD, or memory. The audio file can be, for example, a WAV, MP3, or other audio file. The audio file can be locally stored or retrieved from a remote location. The audio file can be received, for example, in response to a user selection of a particular audio file. In some implementations, a user uploads the audio file from a client device. The system 200 can receive the audio file from an application. For example, a digital audio workstation can provide the audio file before or after digital signal processing.

The system analyzes 204 the audio file to logically identify portions of the audio file as corresponding to a particular audio type. In some implementations, the audio type includes speech. For example, the audio type may be a dialogue type. The system can identify portions with dialogue and provide no identifier for non-dialogue portions. Alternatively, the system can use a classifier to determine the audio type of particular portions of the audio file. For example, the audio types can include dialogue, silence, applause, and music. In some implementations, the audio types include more than one audio type, e.g., dialogue and applause or dialogue and music.

The system generates 206 a time-ordered classification of the identified portions. In some implementations, the system indicates the audio type and position within the audio file of each respective portion. For example, the system can associate a string of data to each portion, providing the beginning and end time of each portion.

The system generates 208 a queue that identifies the portions of the audio file classified as belonging to one of the speech types. The queue does not include identifiers for portions of the audio file that are not classified as belonging to one of the speech types. For example, the queue can identify portions of the audio file classified as having a speech type, e.g., the dialogue type. The queue can also identify portions that have at least the dialogue type. For example, the system can identify some portions as having both the dialogue type and the music type. In some implementations, the system copies and stores the portions that the queue identifies to a new location. Alternatively, the system can generate a list of pointers or other logical identifiers for portions in the audio file that the queue identifies.

As shown in FIG. 1, the appended data can provide time codes for the time interval in the audio file 102, e.g., a dialogue portion beginning at T9 and ending at T12. In some implementations, the system positions each respective portion in the order it appears in the audio file 102. For example, the two portions of a dialogue portion in FIG. 1 would be placed in the order that they appear in the audio file 102 so that section T9-T10 appears before section T11-T12.

The system distributes 210 processor job descriptors for the portions of the audio file in the queue to processors for speech-to-text processing. Each job identifies or includes a particular portion of the audio data for processing. For example, the system can distribute one or more of the processor job descriptors for the portions to the processors in a first-in-first-out order from the queue. In some implementations, the system logically partitions some of the portions after generating the queue to determine file sizes appropriate for the processors and the lag associated with communication between the processor and the location of the file. For example, if the processor is in a remote location where lag associated with the communication between the processor and the location of the file will take longer than the speech-to-text processing, the system can determine processor job descriptors for multiple portions to send to the processor and logically partition at least some of the portions together to remove lag time. Alternatively, the system can monitor the processing speed of the queue and determine that at least one processor can process more data. The system can reroute or distribute job descriptors of the remaining portions to the processor instead of the originally intended processor with a larger amount of data remaining to be processed.

In some implementations, the processors are in a single device. For example, a computing device may have two processors to perform speech-to-text processing or one or more distinct processors having multiple cores. Alternatively, the processors are separately located and connected through a network. For example, the system can be located in various points through a network. The network can be a local area network, a wide area network, or in a "cloud" across the Internet. The system can allow for multiple audio files to be uploaded for processing and designate various processors for each audio file. Alternatively, each processor can process any portion of any audio file as the processor becomes available to do so.

The system performs 212 speech-to-text processing on each portion to generate a corresponding text file. In particular, each processor processes the portions identified by the received job assignments. For example, for a given identified portion, the processor receives data from the audio file corresponding to the identified portion. The speech-to-text processing can map a frequency domain analysis representation of the portions to phonemes. The system can resolve the phonemes using a concordance or a dictionary in combination with one or more language models. In some implementations, each processing module can have its own concordance or dictionary stored locally. Alternatively, the system can store a single concordance or dictionary in a central location.

The system merges 214 the corresponding text files to generate a transcription file. For example, the system can merge the text files in order based on the sequence in which the portions occur within the audio file. In some implementations, the system merges text files as they are generated into larger text files. The system then merges the larger text files to generate the transcription file. Alternatively, the system merges the text files into the transcription file in a serial order with respect to the location of the portions in the audio file. For example, transcriptions of the portions T1-T3 and T4-T5 in FIG. 1 would appear in the same order as they do in the audio file 102.

The system stores 216 the transcription file. The transcription file can be stored locally or remotely. In some implementations, the transcription file is transmitted to another location for storing. Additionally, the transcription file can be further processed, e.g. conversion from a .txt file to an .html file or performing a spell-check or grammar check on the transcribed text.

Figure 3:
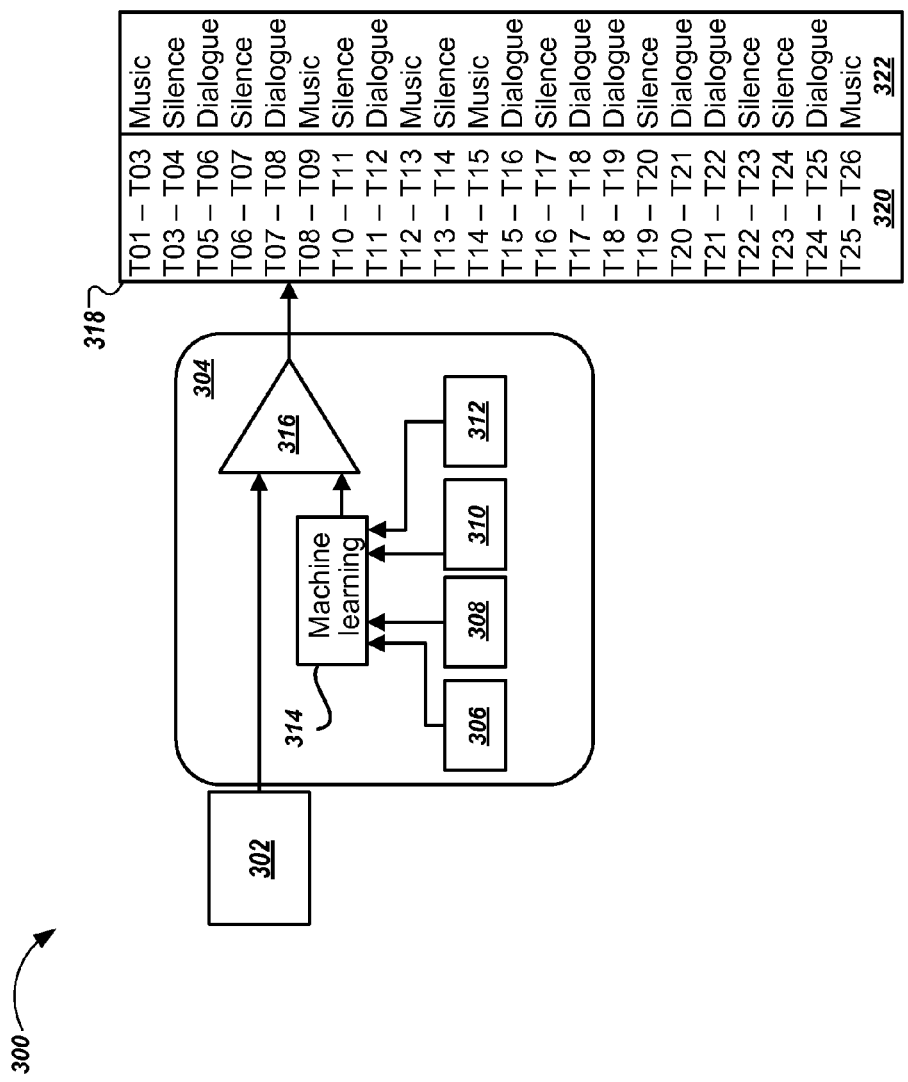
FIG. 3 is a diagram representing an example classification system for identifying portions of an audio file corresponding to one or more audio types.

FIG. 3 is a diagram representing an example classification system 300 for identifying portions of an audio file corresponding to one or more audio types. The system 300 receives an audio file 302 in a signal classifier 304 to develop a probabilistic representation to analyze the audio file 302. The signal classifier 304 processes an input audio file (e.g., audio file 302) to generate a content portion list 318 that identifies classified audio portions and associated time intervals. In FIG. 3, the signal classifier 304 compares the audio file 302 to sample audio representations, including a sample dialogue representation 306, a sample music representation 308, a sample dialogue and music representation 310, and a sample silence representation 312. The signal classifier 304 processes these sample representations using a machine learning module 314 to generate data for a comparator 316 to compare against the audio file 302. Using the comparison generated from the comparator 316, the signal classifier 304 generates the content portion list 318 associating timing codes 320 with audio types 322 to each portion of the audio file 302.

In some implementations, the signal classifier 304 identifies portions of the audio file 302 as corresponding to one or more particular audio types. For example, the signal classifier 304 can identify the portions of the audio signal having audio types as including a speech type.

However, the audio types that do not include a speech type can still include data with spoken language. For example, a portion with an action type, where explosions, gunfire, car chase sounds, or other action sounds predominate the portion, may still have spoken language. In some implementations, the signal classifier 304 is trained offline using representative audio signal files and stores a compact probabilistic representation of each file to compare against the audio file 302.

In some implementations, the portions have multiple types or sub-classifications to identify to the system whether or not a portion can be classified for speech-to-text processing. For example, the sample dialogue and music representation 310 can provide a comparison file to provide the classifier that a portion has both dialogue and lyrics that can be processed using speech-to-text processing.

As shown in FIG. 3, the content portion list 318 may only list the portion as having the dialogue type in the audio types 322 for a portion with both music and dialogue to designate that the portion should be queued for speech-to-text processing. Alternatively, the system 300 can list both types in the content portion list 318 for the processors. In some implementations, types that are not specific to speech designate a portion for further digital signal processing to enhance speech within the portion. Likewise, the system 300 can perform digital signal processing to reduce artifacts within the portion that may generate false positives in speech-to-text processing.

Figure 4:
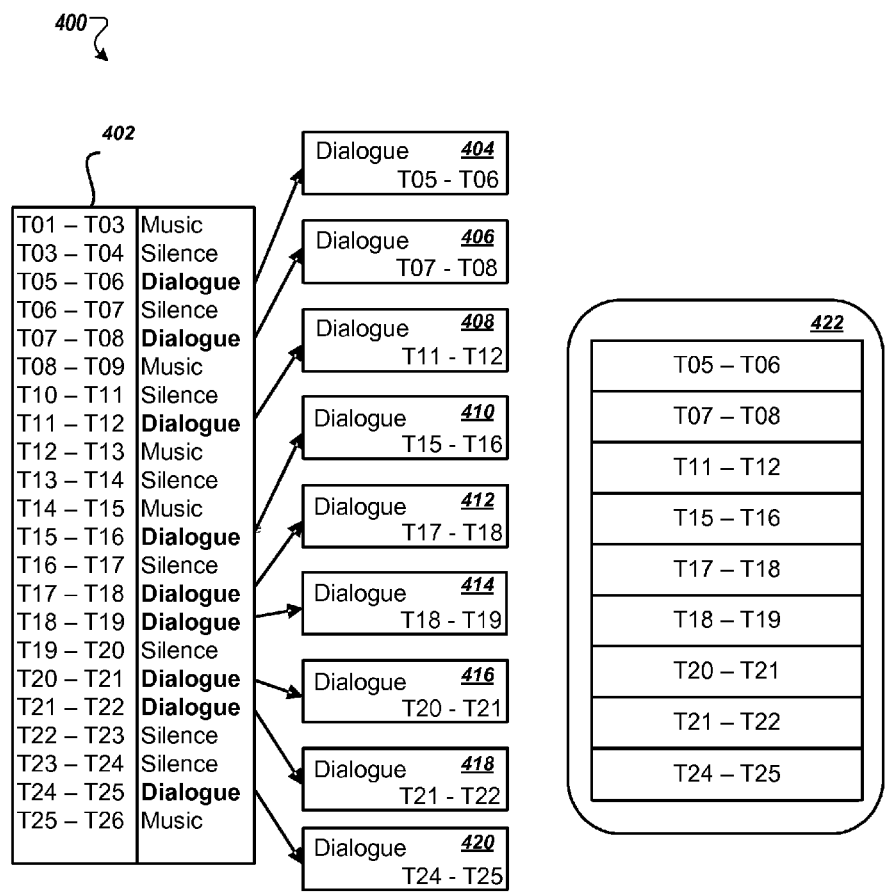
FIG. 4 is a diagram representing an example system for generating a time-ordered classification of portions of an audio file.

FIG. 4 is a diagram representing an example system 400 for generating a time-ordered classification of portions of an audio file. A content portion list 402 provides timing codes and audio types for each portion of the audio file. The timing code indicates the position of a respective portion within the audio file. The system 400 filters portions of the audio file that are classified as having dialogue types (404-420). The system identifies the dialogue portions (404-420) to generate a queue 422. In some other implementations, the queue includes portions identified as belonging to other speech types in addition to a dialogue type. The queue can determine processor job descriptors for portions of the audio file for parallel processing. Alternatively, the queue can involve transferring the portion from the audio file to store in another location, copying the portion from the audio file to transfer the copy to another location, or storing a pointer to the portion in the audio file and storing the pointers.

In some implementations, the time-ordered classification includes determining a time interval for each portion of the identified portions. For example, the time-ordered classification in FIG. 4 displays a nearly equal distribution of the processor job descriptors for the portions over the time in the audio file, e.g., dialogue from T05 to T06, silence from T06 to T07, and dialogue from T07 to T08. In some implementations, the portions are partitioned according to the amount of data for processing, for example, by the amount of dialogue estimated in a particular partition. For example, if an audio file has a very fast speaker and a very slow speaker, the portions with the slow speaker may be for longer periods of time than the portions with the fast speaker.

In some implementations, the queue 422 includes generating portion descriptors for each portion. The portion descriptors can include metadata associated with amount of time and classifiers associated with the portions of the audio file. For example, the time-ordered classification can be the starting point and ending point of each portion, e.g., two byte offset values. Likewise, the metadata can include audio type data, density of dialogue data, and an indicator of the order that the portion belongs in the audio file.

Figure 5:
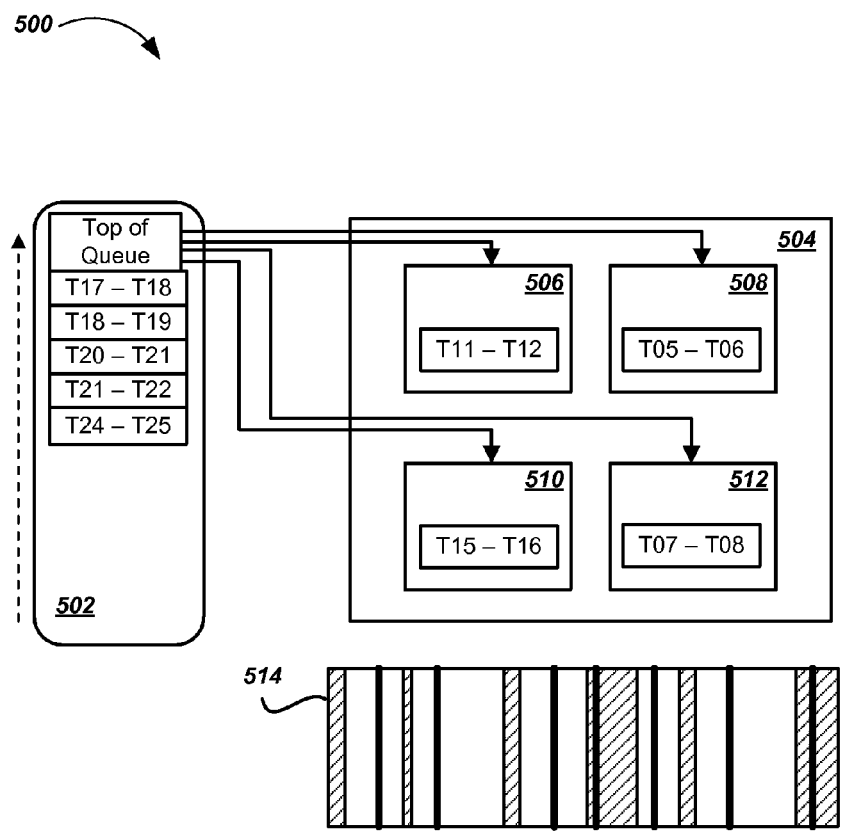
FIG. 5 is a diagram representing an example system for distributing processor job descriptors for portions of an audio file to processors for speech-to-text processing.

FIG. 5 is a diagram representing an example system 500 for distributing processor job descriptors for portions of an audio file 514 to processors for speech-to-text processing. The system distributes processor job descriptors for portions of the audio file 514 from a queue 502 to a multi-core platform 504 amongst processors (506-512) for speech-to-text processing. The queue 502 distributes the processor job descriptors for the portions of the audio file 514 for processing. Each of the processors (506-512) can execute its own transcription of portion descriptors. In some implementations, the system 500 partitions the queue 502 into units based on a specified amount of time. The system 500 can partition the units in substantially equal amounts of time to each of the processors (506-512).

In some implementations, the system 500 distributes processor job descriptors for the portions of the audio file in the queue 502 to the processors in a first-in-first-out order. Alternatively, the system 500 can distribute the processor job descriptors for the portions of the queue in a last-in-first-out order. In some implementations, the system 500 applies a processor sharing order where network capacity is shared between the processor job descriptors of the portions of the audio signal. The processor job descriptors can effectively experience the same delay, or priority order, where processor job descriptors with high priority are served first. For example, the system estimates that a first processor job descriptor has more speech data than a second processor job descriptor, the system can transmit the first processor job descriptor to clear the larger portions of data for speech-to-text processing.

In some implementations, the system 500 distributes the processor job descriptors for portions of the queue 502 before the generated queue 502 is completed. For example, the first processor job descriptors classified can be part of a first-in-first-out system. The system 500, using a first-in-first-out system, can implement multi-core processing as the system 500 identifies portions of the audio file 514 for the queue 502. In some implementations, the system 500 generates the queue 502 in partitions. For example, the system 500 can generate a first queue partition from a first partition of the audio file to allow the system 500 to distribute the processor job descriptors for portions of the audio file in the first queue partition to processors before generating a second queue partition. Alternatively, the system 500 can generate the second queue partition and distribute processor job descriptors for portions of the audio file from the first partition concurrently.

Figure 6:
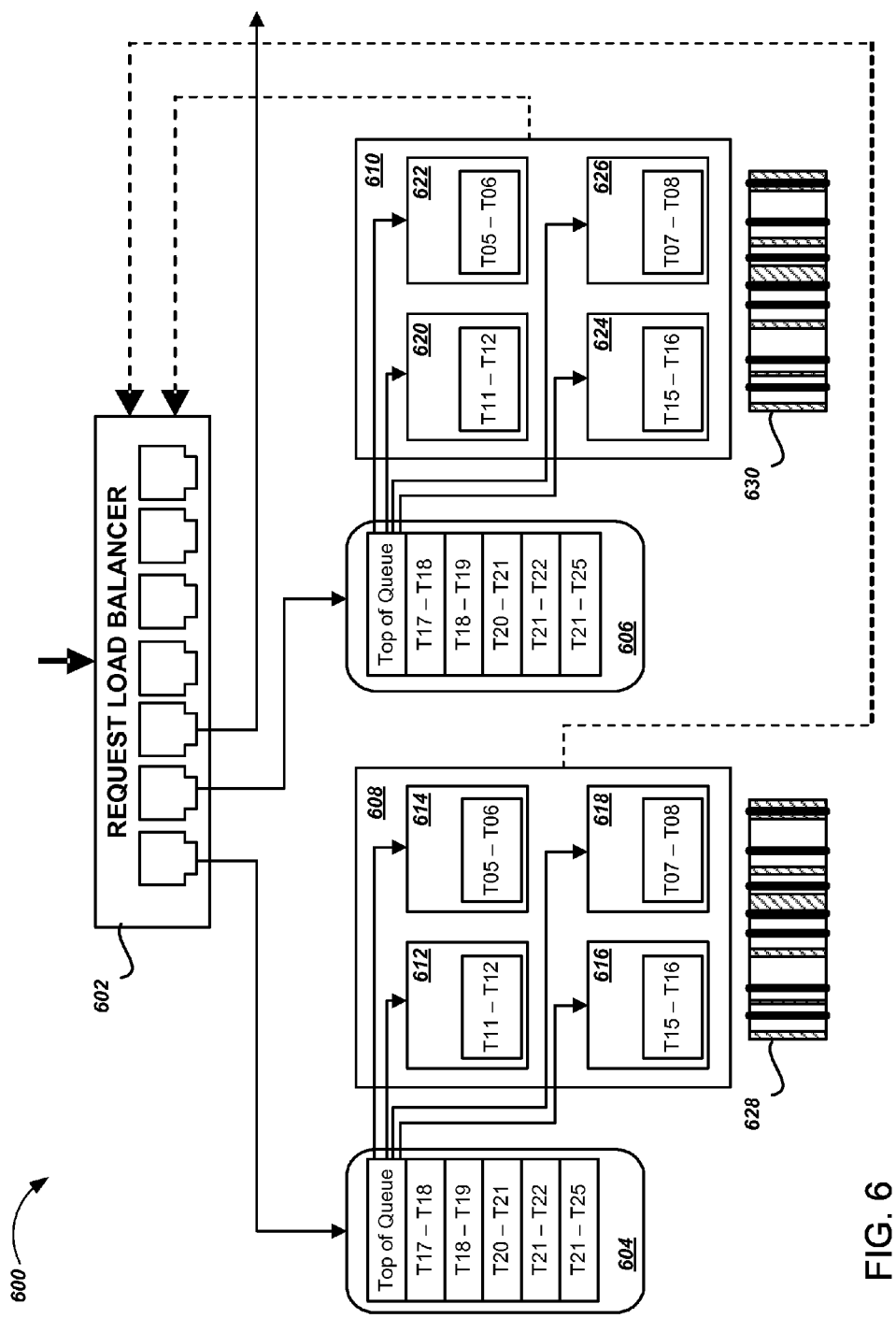
FIG. 6 is a diagram representing an example system for distributing processor job descriptors for portions of an audio file to processors distributed over a network.

FIG. 6 is a diagram representing an example system 600 for distributing processor job descriptors for portions of an audio file to processors distributed over a network. In particular, the system 600 includes a load balancer 602 receiving requests for processing. The load balancer 602 provides processor job descriptors from queues (604-606) to multi-core platforms (608-610), each with processors (612-626) for speech-to-text processing. The queues (604-606) each have at least a portion of an audio file (628-630) to distribute processor job descriptors to the multi-core platforms (608-610). The multi-core platforms (608-610) transmit text files generated by the processors (612-626) to the load balancer 602.

In some implementations, the portions of audio file (628-630) in the queue (604-606) are distributed processor job descriptors to two or more remote locations, each remote location including two or more processors. For example, the load balancer 602 can upload each request and transmit the audio file (628-630) to the multi-core platforms (608-610). In some implementations, one of the queues (604-606) exists in a centralized location, e.g., a load balancer node. For example, the processors (612-626) can read the partitions from the one of the queues (604-606) directly.

The remote locations can be connected to one or more other remote locations. For example, the system 600 can include multiple processing nodes. The system can use various techniques to distribute the processor job descriptors for data for parallel processing. For example, the system can use MapReduce to process data across a large network. The system can provide an upload site for a user to upload the audio file so that the user's client device transmits the audio file and then downloads the completed transcription. In some implementations, a user uploads an audio file through an application on a client device. The client device can transmit the audio file to the load balancer 602 for processing. A central processing node can classify portions of the audio file.

In some implementations, the system 600 exploits all processing cores in the central node. Once the system 600 has completed the processing, the load balancer 602 can transmit a final product to the client device. Alternatively, the client device application can generate the queue before sending processor job descriptors for portions of the audio file to the load balancer 602 for processing. The system 600 can also split the queues (604-606) for processing in locations within the network. The system 600 can process more than one audio file at a time.

In some implementations, the system 600 detects an error that occurred. For example, the error can be a non-recoverable error, e.g., out of disk space for text files. The system 600 can halt processing portions of the audio file (628-630) or merging text files. The text files can be deleted or stored in memory. In some implementations, the system 600 detects an error that can be recoverable, e.g., a transient error during processing a portion of the audio file (628-630). For example, the system 600 can attempt speech-to-text processing for a specified number of attempts. If the attempts all fail, the system 600 can report an error message to a user.

Figure 7:
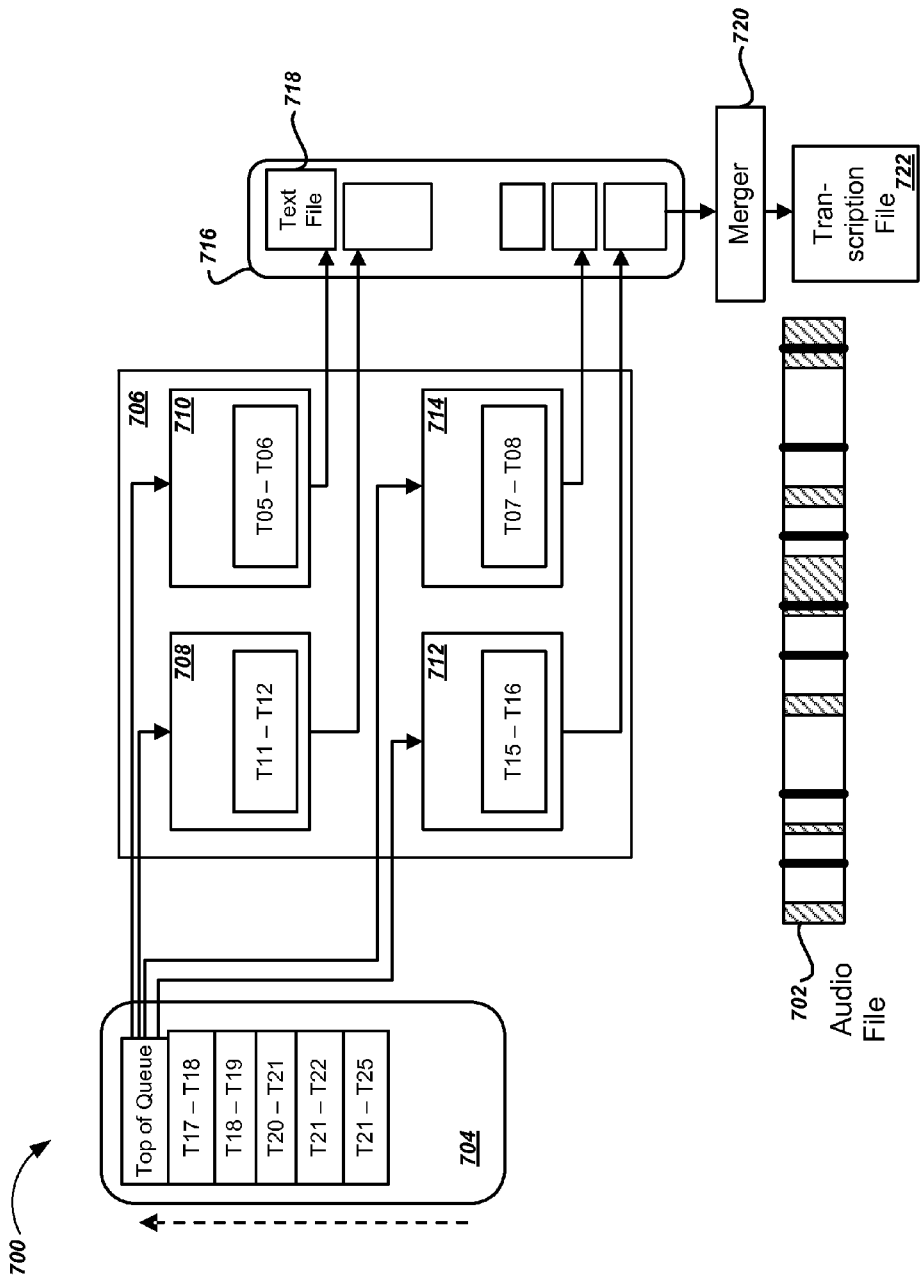
FIG. 7 is a diagram representing an example system for merging text files to generate a transcription file.

FIG. 7 is a diagram representing an example system 700 for merging text files to generate a transcription file. The system 700 distributes processor job descriptors for portions of an audio file 702 from a queue 704 to a multi-core platform 706. The multi-core platform 706 assigns the portions amongst processors (708-714) for speech-to-text processing. The processors (708-714) generate text files 716 from the portions of the queue 704. The system 700 merges each text file 718 using a merger 720 to generate a transcription file. In some implementations, the system 700 merges the text files 716 amongst the processors (708-714). The system 700 can store the transcription file 722 in a computer readable medium.

In some implementations, the system 700 performs speech-to-text processing on each portion of the queue 704 to generate a corresponding text file 718. Alternatively, each processor (708-714) can generate a single text file with metadata for the merger 720 to generate the transcription file 722. The text files 716 can be merged in order based on the order that the portions of the audio file 702 occur within the audio file 702. In some implementations, the system 700 merges the text files 718 serially. Alternatively, the system 700 can merge the text files 718 in a parallel system, merging the text files 718 into groups and then merging the groups of text files 718 in a hierarchical fashion.

Figure 8:
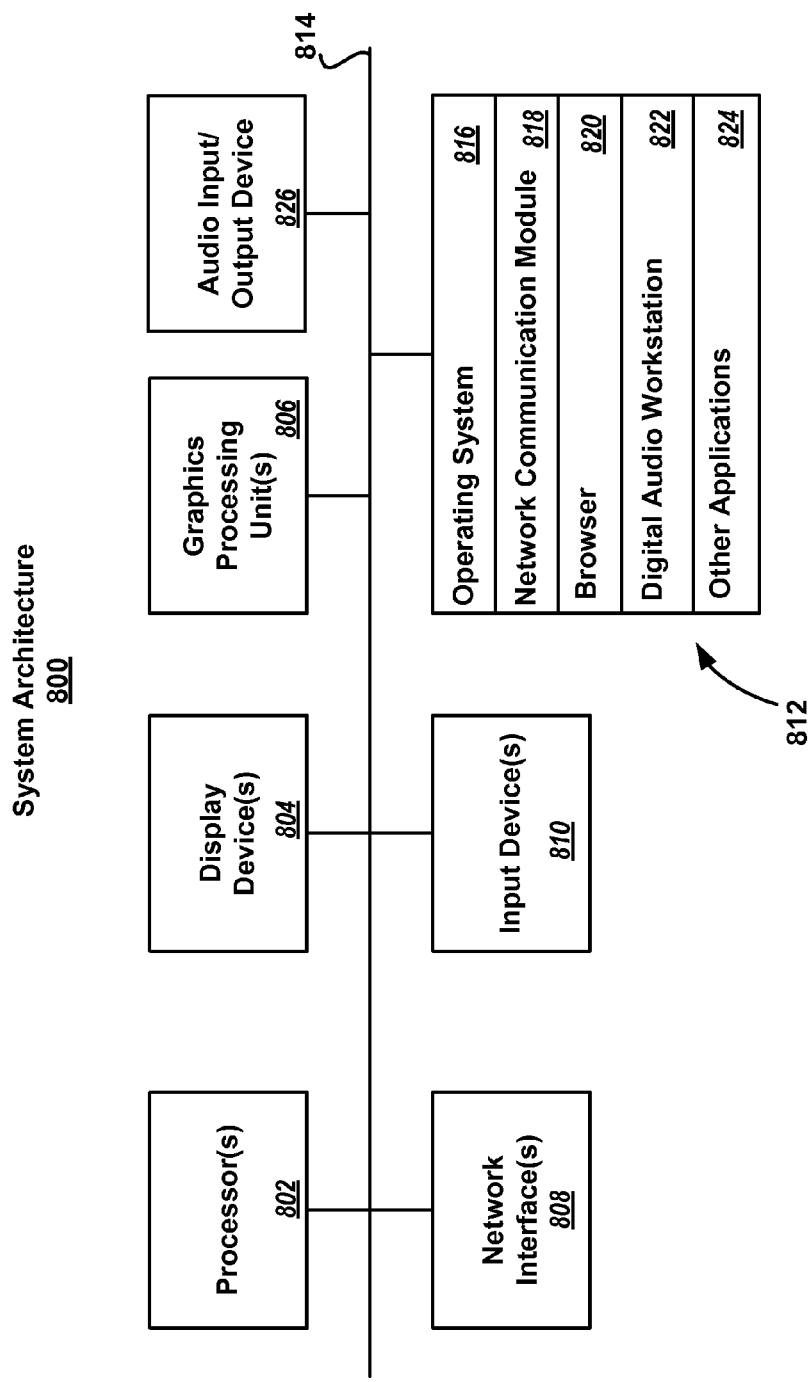
FIG. 8 is a block diagram of an exemplary user system architecture.

FIG. 8 is a block diagram of an exemplary user system architecture 800. The system architecture 800 is capable of hosting an audio processing application that can electronically receive, display, and edit one or more audio signals. The architecture 800 includes one or more processors 802 (e.g., IBM PowerPC, Intel Pentium 4, etc.), one or more display devices 1404 (e.g., CRT, LCD), graphics processing units 806 (e.g., NVIDIA GeForce, etc.), a network interface 808 (e.g., Ethernet, FireWire, USB, etc.), input devices 810 (e.g., keyboard, mouse, etc.), and one or more computer-readable mediums 812. These components exchange communications and data using one or more buses 814 (e.g., EISA, PCI, PCI Express, etc.).

The term "computer-readable medium" refers to any medium that participates in providing instructions to a processor 802 for execution. The computer-readable medium 812 further includes an operating system 816 (e.g., Mac OS®, Windows®, Linux, etc.), a network communication module 818, a browser 820 (e.g., Safari®, Microsoft® Internet Explorer, Netscape®, etc.), a digital audio workstation 822, and other applications 824.

The operating system 816 can be multi-user, multiprocessing, multitasking, multithreading, real-time and the like. The operating system 816 performs basic tasks, including but not limited to: recognizing input from input devices 810; sending output to display devices 804; keeping track of files and directories on computer-readable mediums 812 (e.g., memory or a storage device); controlling peripheral devices (e.g., disk drives, printers, etc.); and managing traffic on the one or more buses 814. The network communications module 818 includes various components for establishing and maintaining network connections (e.g., software for implementing communication protocols, such as TCP/IP, HTTP, Ethernet, etc.). The browser 820 enables the user to search a network (e.g., Internet) for information (e.g., digital media items).

The digital audio workstation 822 provides various software components for performing the various functions for amplifying the primarily dominant signal in a audio data file, as described with respect to FIGS. 1-7 including receiving an audio file, analyzing the audio file to identify portions corresponding to audio types, generating time-ordered classifications of the identified portions, generating a queue including the classified portions, distributing processor job descriptors for the portions in the queue to processors to process the portions into text files, and merging the text files in the order of the portions in the audio file to generate a transcription file. The digital audio workstation can receive inputs and provide outputs through an audio input/output device 626.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers.

The apparatus can include, in addition to hardware, code that generates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any fond of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   receiving an audio file;
   analyzing the audio file to identify portions of the audio file as corresponding to one or more audio types, the one or more audio types including one or more speech types;
   generating a time-ordered classification of the identified portions, the time-ordered classification indicating the one or more audio types and position within the audio file of each respective portion;
   generating a queue using the time-ordered classification, the queue including a plurality of jobs where each job includes one or more identifiers of a respective portion of the audio file classified as belonging to the one or more speech types;
   distributing the jobs in the queue to a plurality of processors for speech-to-text processing of the corresponding portion of the audio file;
   performing speech-to-text processing on each portion to generate a corresponding text file; and
   merging the corresponding text files to generate a transcription file, the text files merged in order based on the order in which the portions of the audio file occur within the audio file.

2. The method of claim 1, where the distribution of the processor job descriptors for the portions of the audio file in the queue occurs in a first-in-first-out order.

3. The method of claim 1, where one or more of the jobs in the queue are distributed before the generated queue is completed.

4. The method of claim 3, where merging the text files is divided recursively amongst the plurality of processors.

5. The method of claim 1, where the plurality of processors are distributed amongst one or more computing devices.

6. The method of claim 1, where the jobs in the queue are distributed to two or more remote locations, each remote location including a plurality of processors, each remote location connected to one or more other remote locations.

7. The method of claim 1, where the one or more audio types includes data with spoken language.

8. The method of claim 1, where distributing jobs in the queue to the plurality of processors further comprises:
   partitioning the queue into units based on a specified amount of time; and
   partitioning the units in substantially equal amounts of time to each of the plurality of processors.

9. The method of claim 1, where distributing jobs in the queue for the portions of the audio file in the queue to the plurality of processors further comprises:
partitioning the queue into units based on a specified amount of data; and
partitioning the units in substantially equal amounts of data to each of the plurality of processors.

10. The method of claim 1, where a client device identifies and classifies the portions of the audio file into the one or more audio types within the audio file.

11. The method of claim 1, further comprising:
partitioning the received audio file for identification and classification using a plurality of classifiers.

12. The method of claim 11, where the plurality of classifiers comprise one or more of the following classifiers: dialogue, applause, music, silence, and ambient noise.

13. The method of claim 1, further comprising:
storing the transcription file.

14. The method of claim 1, where generating the queue includes generating portion descriptors for each portion.

15. The method of claim 14, where the portion descriptors comprise metadata associated with amount of time and one or more classifiers associated with the portions of the audio file.

16. The method of claim 1, where the time-ordered classification includes determining a time interval for each portion of the identified portions.

17. A computer program product, encoded on a non-transitory computer-readable medium, operable to cause data processing apparatus to perform operations comprising:
receiving an audio file;
analyzing the audio file to identify portions of the audio file as corresponding to one or more audio types, the one or more audio types including one or more speech types;
generating a time-ordered classification of the identified portions, the time-ordered classification indicating the one or more audio types and position within the audio file of each respective portion;
generating a queue using the time-ordered classification, the queue including a plurality of jobs where each job includes one or more identifiers of a respective portion of the audio file classified as belonging to the one or more speech types;
distributing the jobs in the queue to a plurality of processors for speech-to-text processing of the corresponding portion of the audio file;
performing speech-to-text processing on each portion to generate a corresponding text file; and
merging the corresponding text files to generate a transcription file, the text files merged in order based on the order in which the portions of the audio file occur within the audio file.

18. The computer program product of claim 17, where the distribution of the processor job descriptors for the portions of the audio file in the queue occurs in a first-in-first-out order.

19. The computer program product of claim 17, where one or more of the jobs in the queue are distributed before the generated queue is completed.

20. The computer program product of claim 19, where merging the text files is divided recursively amongst the plurality of processors.

21. The computer program product of claim 17, where the plurality of processors are distributed amongst one or more computing devices.

22. The computer program product of claim 17, where the jobs in the queue are distributed to two or more remote locations, each remote location including a plurality of processors, each remote location connected to one or more other remote locations.

23. The computer program product of claim 17, where the one or more audio types includes data with spoken language.

24. The computer program product of claim 17, where distributing jobs in the queue to the plurality of processors further comprises:
partitioning the queue into units based on a specified amount of time; and
partitioning the units in substantially equal amounts of time to each of the plurality of processors.

25. The computer program product of claim 17, where distributing jobs in the queue for the portions of the audio file in the queue to the plurality of processors further comprises:
partitioning the queue into units based on a specified amount of data; and
partitioning the units in substantially equal amounts of data to each of the plurality of processors.

26. The computer program product of claim 17, where a client device identifies and classifies the portions of the audio file into the one or more audio types within the audio file.

27. The computer program product of claim 17, further operable to perform operations comprising:
partitioning the received audio file for identification and classification using a plurality of classifiers.

28. The computer program product of claim 27, where the plurality of classifiers comprise one or more of the following classifiers: dialogue, applause, music, silence, and ambient noise.

29. The computer program product of claim 17, further operable to perform operations comprising:
storing the transcription file.

30. The computer program product of claim 17, where generating the queue includes generating portion descriptors for each portion.

31. The computer program product of claim 30, where the portion descriptors comprise metadata associated with amount of time and one or more classifiers associated with the portions of the audio file.

32. The computer program product of claim 17, where the time-ordered classification includes determining a time interval for each portion of the identified portions.

33. A system comprising:
a processor and a memory operable to perform operations including:
analyzing the audio file to identify portions of the audio file as corresponding to one or more audio types, the one or more audio types including one or more speech types;
generating a time-ordered classification of the identified portions, the time-ordered classification indicating the one or more audio types and position within the audio file of each respective portion;
generating a queue using the time-ordered classification, the queue including a plurality of jobs where each job includes one or more identifiers of a respective portion of the audio file classified as belonging to the one or more speech types;
distributing the jobs in the queue to a plurality of processors for speech-to-text processing of the corresponding portion of the audio file;
performing speech-to-text processing on each portion to generate a corresponding text file; and merging the corresponding text files to generate a transcription file, the text files merged in order based on the order in which the portions of the audio file occur within the audio file.

34. The system of claim 33, where the distribution of the processor job descriptors for the portions of the audio file in the queue occurs in a first-in-first-out order.

35. The system of claim 33, where one or more of the jobs in the queue are distributed before the generated queue is completed.

36. The system of claim 35, where merging the text files is divided recursively amongst the plurality of processors.

37. The system of claim 33, where the plurality of processors are distributed amongst one or more computing devices.

38. The system of claim 33, where the jobs in the queue are distributed to two or more remote locations, each remote location including a plurality of processors, each remote location connected to one or more other remote locations.

39. The system of claim 33, where the one or more audio types includes data with spoken language.

40. The system of claim 33, where distributing jobs in the queue to the plurality of processors further comprises:
    partitioning the queue into units based on a specified amount of time; and
    partitioning the units in substantially equal amounts of time to each of the plurality of processors.

41. The system of claim 33, where distributing jobs in the queue for the portions of the audio file in the queue to the plurality of processors further comprises:
    partitioning the queue into units based on a specified amount of data; and
    partitioning the units in substantially equal amounts of data to each of the plurality of processors.

42. The system of claim 33, where a client device identifies and classifies the portions of the audio file into the one or more audio types within the audio file.

43. The system of claim 33, further operable to perform operations comprising:
    partitioning the received audio file for identification and classification using a plurality of classifiers.

44. The system of claim 43, where the plurality of classifiers comprise one or more of the following classifiers: dialogue, applause, music, silence, and ambient noise.

45. The system of claim 33, further operable to perform operations comprising:
    storing the transcription file.

46. The system of claim 33, where generating the queue includes generating portion descriptors for each portion.

47. The system of claim 46, where the portion descriptors comprise metadata associated with amount of time and one or more classifiers associated with the portions of the audio file.

48. The system of claim 33, where the time-ordered classification includes determining a time interval for each portion of the identified portions.

49. A method performed by a computer programmed to provide speech-to-text processing, the method comprising:
    receiving an audio file;
    analyzing the audio file to identify portions of the audio file as corresponding to one or more audio types, the one or more audio types including one or more speech types;
    generating a time-ordered classification of the identified portions, the time-ordered classification indicating the one or more audio types and position within the audio file of each respective portion;
    generating a queue using the time-ordered classification, the queue including a plurality of jobs where each job includes one or more identifiers of a respective portion of the audio file classified as belonging to the one or more speech types;
    distributing the jobs in the queue to a plurality of processors for speech-to-text processing of the corresponding portion of the audio file;
    performing speech-to-text processing on each portion to generate a corresponding text file; and
    merging the corresponding text files to generate a transcription file, the text files merged in order based on the order in which the portions of the audio file occur within the audio file.

* * * * *